US012072692B2

(12) United States Patent
Zhu et al.

(10) Patent No.: US 12,072,692 B2
(45) Date of Patent: *Aug. 27, 2024

(54) PARCEL AND ARTICLE SORTING SYSTEM AND METHOD

(71) Applicants: Tompkins Robotics, Inc., Orlando, FL (US); Zhejiang Libiao Robot Co., Ltd., Zhejiang (CN)

(72) Inventors: Jianqiang Zhu, Hangzhou (CN); Juejing Xu, Hangzhou (CN); John C. Spain, Raleigh, NC (US); Michael C. Futch, Raleigh, NC (US); James M. Serstad, Raleigh, NC (US); Richard C. Kaminska, III, Raleigh, NC (US); Selden W. McKnight, Jr., Raleigh, NC (US)

(73) Assignees: Tompkins Robotics, Inc., Orlando, FL (US); Zhejiang Libiao Robot Co., Hangzhou (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/421,450

(22) Filed: Jan. 24, 2024

(65) Prior Publication Data
US 2024/0160200 A1 May 16, 2024

Related U.S. Application Data

(63) Continuation of application No. 18/344,350, filed on Jun. 29, 2023, now Pat. No. 11,892,825, which is a (Continued)

(30) Foreign Application Priority Data
Jul. 22, 2015 (CN) .......................... 20151043399.5

(51) Int. Cl.
G05B 19/418 (2006.01)
B07C 3/00 (2006.01)
(Continued)

(52) U.S. Cl.
CPC ........ *G05B 19/41895* (2013.01); *B07C 3/008* (2013.01); *B07C 3/02* (2013.01);
(Continued)

(58) Field of Classification Search
CPC ..... G05B 19/41895; B07C 3/008; B07C 3/02; B07C 3/06; B07C 3/08; B07C 3/14;
(Continued)

(56) References Cited

U.S. PATENT DOCUMENTS 4,895,242 A * 1/1990 Michel ................. B65G 47/965
198/704
5,875,434 A * 2/1999 Matsuoka .......... G05B 19/4189
700/229

(Continued)

FOREIGN PATENT DOCUMENTS

CN 104525488 A * 4/2015 ............... B07C 3/18
CN 104525488 A 4/2015
(Continued)

OTHER PUBLICATIONS

WIPO, International Preliminary Report On Patentability for International Patent Application No. PCT/US2018/019135, issued Sep. 10, 2019, 14 pages.
(Continued)

*Primary Examiner* — Thomas Randazzo
(74) *Attorney, Agent, or Firm* — Parthiban A Mathavan

(57) ABSTRACT

A system includes an article supply location, wherein the article supply location includes a plurality of articles to be sorted, first and second transport vehicles, each having a first position in which an article is stowed about the vehicle and
(Continued)

a second position in which the article is deposited into a proximal container. And a control system. The control system is configured to receive an order for a plurality of disparate articles, determine one destination container of a plurality of destination containers to direct the transport vehicle to deposit a selected article, direct the first transport vehicle to transport a selected article to the destination container and deposit the article by manipulation of the first transport vehicle from the first position to the second position for deposit of the selected article in the destination container.

20 Claims, 4 Drawing Sheets

Related U.S. Application Data continuation of application No. 17/930,519, filed on Sep. 8, 2022, now Pat. No. 11,714,401, which is a continuation of application No. 17/190,812, filed on Mar. 3, 2021, now Pat. No. 11,630,448, which is a continuation of application No. 16/353,250, filed on Mar. 14, 2019, now Pat. No. 10,968,087, which is a continuation of application No. 15/984,757, filed on May 21, 2018, now Pat. No. 10,248,112, which is a continuation of application No. 15/455,094, filed on Mar. 9, 2017, now Pat. No. 9,975,148, which is a continuation-in-part of application No. PCT/CN2016/090684, filed on Jul. 20, 2016.

(51) Int. Cl.
| | | |
|---|---|---|
| *B07C 3/02* | (2006.01) | |
| *B07C 3/06* | (2006.01) | |
| *B07C 3/08* | (2006.01) | |
| *B07C 3/14* | (2006.01) | |
| *B07C 3/18* | (2006.01) | |
| *B65G 1/04* | (2006.01) | |
| *B65G 1/06* | (2006.01) | |
| *B65G 1/137* | (2006.01) | |
| *B66F 9/06* | (2006.01) | |
| *G05D 1/00* | (2006.01) | |
| *G05D 1/692* | (2024.01) | |
| *G06Q 10/08* | (2023.01) | |
| *G06Q 10/087* | (2023.01) | |
| *G06Q 50/40* | (2024.01) | |

(52) U.S. Cl.
CPC ............. *B07C 3/06* (2013.01); *B07C 3/08* (2013.01); *B07C 3/14* (2013.01); *B07C 3/18* (2013.01); *B65G 1/0492* (2013.01); *B65G 1/06* (2013.01); *B65G 1/065* (2013.01); *B65G 1/137* (2013.01); *B65G 1/1373* (2013.01); *B66F 9/063* (2013.01); *G05D 1/0291* (2013.01); *G05D 1/692* (2024.01); *G06Q 10/08* (2013.01); *G06Q 10/087* (2013.01); *B07C 2301/00* (2013.01); *B65G 1/0464* (2013.01); *B65G 2201/0285* (2013.01); *B65G 2203/0216* (2013.01); *B65G 2203/044* (2013.01); *B65G 2209/02* (2013.01); *G06Q 50/40* (2024.01)

(58) Field of Classification Search
CPC ..... B07C 3/18; B07C 2301/00; B65G 1/0492; B65G 1/06; B65G 1/065; B65G 1/137; B65G 1/1373; B65G 1/0464; B65G 2201/0285; B65G 2203/0216; B65G 2203/044; B65G 2209/02; B66F 9/063; G05D 1/0291; G05D 1/692; G06Q 10/08; G06Q 10/087; G06Q 50/40

See application file for complete search history.

(56) References Cited

U.S. PATENT DOCUMENTS

| | | | |
|---|---|---|---|
| 6,234,737 B1 | 5/2001 | Young | |
| 6,505,093 B1 | 1/2003 | Thatcher | |
| 6,762,382 B1* | 7/2004 | Danelski | B65G 17/002 |
| | | | 209/912 |
| 6,775,588 B1* | 8/2004 | Peck | B65G 1/1373 |
| | | | 700/214 |
| 6,895,301 B2 | 5/2005 | Mountz | |
| 7,221,276 B2* | 5/2007 | Olsen, III | B07C 7/005 |
| | | | 700/226 |
| 7,246,706 B1* | 7/2007 | Shakes | B07C 7/02 |
| | | | 209/614 |
| 7,402,018 B2 | 7/2008 | Mountz et al. | |
| 7,826,919 B2 | 11/2010 | DAndrea et al. | |
| 7,912,574 B2 | 3/2011 | Wurman et al. | |
| 7,991,505 B2 | 8/2011 | Lert, Jr. et al. | |
| 8,280,547 B2 | 10/2012 | DAndrea et al. | |
| 8,442,266 B2* | 5/2013 | Berger | B07C 3/14 |
| | | | 382/101 |
| 8,515,575 B2* | 8/2013 | Pfeiffer | G06Q 10/08 |
| | | | 700/242 |
| 8,639,382 B1 | 1/2014 | Clark et al. | |
| 8,718,814 B1 | 5/2014 | Clark et al. | |
| 8,731,708 B2* | 5/2014 | Shakes | G06Q 10/087 |
| | | | 700/216 |
| 9,010,517 B2 | 4/2015 | Hayduchok et al. | |
| 9,037,286 B2 | 5/2015 | Lert | |
| 9,067,744 B2 | 6/2015 | Takizawa et al. | |
| 9,152,149 B1 | 10/2015 | Palamarchuk et al. | |
| 9,317,034 B2 | 4/2016 | Hoffman et al. | |
| 9,342,811 B2 | 5/2016 | Mountz et al. | |
| 9,346,620 B2 | 5/2016 | Brunner et al. | |
| 9,436,184 B2 | 9/2016 | DAndrea et al. | |
| 9,519,882 B2* | 12/2016 | Galluzzo | B65G 1/1375 |
| 9,600,798 B2 | 3/2017 | Battles et al. | |
| 9,656,804 B2* | 5/2017 | Lyon | G06Q 10/0875 |
| 9,751,693 B1 | 9/2017 | Battles | |
| 9,802,759 B2 | 10/2017 | Lert, Jr. | |
| 9,855,586 B2 | 1/2018 | Chirol et al. | |
| 9,950,863 B2 | 4/2018 | OBrien et al. | |
| 10,968,087 B2* | 4/2021 | Zhu | B65G 1/065 |
| 11,630,448 B2* | 4/2023 | Zhu | B07C 5/36 |
| | | | 700/215 |
| 11,714,401 B2* | 8/2023 | Zhu | B65G 1/0492 |
| | | | 700/215 |
| 11,892,825 B2* | 2/2024 | Zhu | B07C 3/18 |
| 2004/0073333 A1 | 4/2004 | Brill | |
| 2007/0065258 A1 | 3/2007 | Benedict et al. | |
| 2007/0071585 A1 | 3/2007 | Henkel | |
| 2007/0150383 A1 | 6/2007 | Shakes | |
| 2012/0290125 A1 | 11/2012 | Perry | |
| 2014/0157732 A1 | 6/2014 | Gasber | |
| 2014/0244026 A1* | 8/2014 | Neiser | B65G 1/1378 |
| | | | 700/216 |
| 2014/0277691 A1* | 9/2014 | Jacobus | B66F 9/24 |
| | | | 700/216 |
| 2015/0081090 A1* | 3/2015 | Dong | G06T 19/20 |
| | | | 700/230 |
| 2016/0101940 A1 | 4/2016 | Grinnell | |
| 2016/0145044 A1 | 5/2016 | Mountz | |
| 2016/0200516 A1 | 7/2016 | Baker | |
| 2016/0325315 A1* | 11/2016 | Zimmer | B07C 3/06 |
| 2016/0355337 A1* | 12/2016 | Lert | B65G 1/0478 |
| 2017/0200248 A1 | 7/2017 | Murphy | |
| 2018/0039282 A1 | 2/2018 | Gupta et al. | |
| 2018/0111808 A1 | 4/2018 | Hoeltgen et al. | |

(56) References Cited

U.S. PATENT DOCUMENTS

2018/0275680 A1    9/2018  Gupta et al.
2019/0064785 A1    2/2019  Wurman et al.

FOREIGN PATENT DOCUMENTS

| CN | 105929740 A  | 9/2016  |
|----|--------------|---------|
| CN | 206661696 U  | 11/2017 |
| CN | 107458828 A  | 12/2017 |
| EP | 1590272 B1   | 8/2010  |
| EP | 3172016 A1   | 5/2017  |

OTHER PUBLICATIONS

"CIPO, Examination Report for corresponding Canadian Patent Application No. 3,055,947, dated Nov. 12, 2020, 17 pages".
USPTO, Non-Final Rejection in U.S. Appl. No. 16/353,250 dated Aug. 28, 2019.
USPTO, Final Rejection in U.S. Appl. No. 16/353,250 dated Apr. 17, 2020.
USPTO, Non-Final Rejection in U.S. Appl. No. 16/353,250 dated Apr. 11, 2019.
USPTO, Non-Final Rejection in U.S. Appl. No. 16/353,250 dated Aug. 31, 2020.
EPO, Extended European Search Report in European Application No. 18846871.4-1014 dated Mar. 15, 2021.
"EPO, Extended European Search Report for corresponding EP Patent Application No. 18764345.7, mailed Apr. 21, 2021, 9 pages".
CIPO, Office Action for corresponding Canadian Patent Application No. 3,055,947, dated Sep. 28, 2021, 4 pages.

* cited by examiner

PARCEL AND ARTICLE SORTING SYSTEM AND METHOD

CROSS-REFERENCE TO RELATED APPLICATIONS

This application is a continuation application of U.S. patent application Ser. No. 18/344,350 filed on Jun. 29, 2023, which is a continuation of U.S. patent application Ser. No. 17/930,519 filed on Sep. 8, 2022 and issued as U.S. Pat. No. 11,714,401 on Aug. 1, 2023, which is a continuation application of U.S. patent application Ser. No. 17/190,812 filed on Mar. 3, 2021 and issued as U.S. Pat. No. 11,630,448 on Apr. 18, 2023, which is a continuation of U.S. patent application Ser. No. 16/353,250 filed on Mar. 14, 2019 and issued as U.S. Pat. No. 10,968,087 on Apr. 6, 2021, which is a continuation of U.S. patent application Ser. No. 15/984,757 filed on May 21, 2018 and issued as U.S. Pat. No. 10,248,112 on Apr. 2, 2019, which is a continuation application of U.S. patent application Ser. No. 15/455,094 filed on Mar. 9, 2017 and issued as U.S. Pat. No. 9,975,148 on May 22, 2018, which claims priority to PCT Patent Application No. PCT/CN2016/090684 filed on Jul. 20, 2016, which claims priority to Chinese Patent Application No. CN201510433995.5, filed on Jul. 22, 2015, the entire contents of which are incorporated by reference herein.

TECHNICAL FIELD

The present invention relates to sorting technology, and specifically to a parcel and article sorting system and method.

BACKGROUND ART

Parcel sorting includes dispensing packages going to different destinations to different exits through a delivery device, so as to realize unified transport of packages going to the same destination. This is especially advantageous in a order fulfillment center or shipping facility. Generally, a parcel containing articles for shipment will have a UPC, barcode, SKU, or similar that allows for identification of the parcel identity and destination.

Article sorting includes dispensing articles that come from a plurality of warehouse locations to different exits through a delivery device, so as to realize unified consolidation at a single exit or destination point of all articles in a single order going to a destination in a single package or parcel. This is especially advantageous in any type of parcel fulfillment center.

The process is very labor intensive, which increases cost, errors in processing, and increases the time for packages to arrive, all lessening the end customer experience. Additionally, packages may be damaged, mispackaged, and the like, reducing efficiency for all involved parties.

Automated sorting equipment may be useful for addressing these issues, however, sorting equipment is expensive, requires significant capital investment, takes up large portions of warehouse space, is limited in the volume of packages that can be sorted, is significantly underutilized at less than peak periods, and has a long payback in most cases due to the above factors.

Accordingly, a need exists for a solution to these problems.

DISCLOSURE OF THE INVENTION

In order to make the above-mentioned objects, features and advantages of the present invention clearer and easier to understand, in the following contents, preferable examples are particularly enumerated and described in details with reference to the accompanying figures.

According to one or more embodiments, a system includes an article supply location. The article supply location includes a plurality of articles to be sorted. The system includes first and second transport vehicles, each having a first position in which an article is stowed about the vehicle and a second position in which the article is deposited into a proximal container. The system includes a control system configured to receive an order for a plurality of disparate articles; determine one destination container of a plurality of destination containers to direct the transport vehicle to deposit a selected article; direct the first transport vehicle to transport a selected article to the destination container and deposit the article by manipulation of the first transport vehicle from the first position to the second position for deposit of the selected article in the destination container; direct the second transport vehicle to transport a disparate article to the destination container and deposit the disparate article by manipulation of the second transport vehicle from the first position to the second position for deposit of the disparate article in the destination container; and determine when the order has been completed.

According to one or more embodiments, the system includes an information acquisition device that is configured to interact with the articles.

According to one or more embodiments, the control system is further configured to determine a characteristic of the article by interacting with the article with the information acquisition device.

According to one or more embodiments, the control system is further configured to determine a characteristic of the article by interacting with an identifier of the article with the information acquisition device, wherein the identifier is a UPC or other product code associated with the article.

According to one or more embodiments, the system includes a platform elevated from a surface, wherein each of the first transport vehicle and second transport vehicle traverses the platform.

According to one or more embodiments, the destination container is positioned proximal an opening in the platform. The first transport vehicle traverses the platform proximal the opening in the platform, and then manipulates from the first position to the second position to deposit the article into the destination container.

According to one or more embodiments, each of the first transport vehicle and second transport vehicle carries a respective single selected article.

According to one or more embodiments, the system includes a plurality of additional transport vehicles.

According to one or more embodiments, the control system is configured to direct the first transport vehicle to return to a position proximal the article supply. The first transport vehicle is in the first position upon being positioned proximal the article supply.

According to one or more embodiments, the control system is configured to direct a plurality of additional transport vehicles. The control system is further configured to direct the plurality of additional transport vehicles such that the transport vehicles do not collide with one another.

According to one or more embodiments, a control system configured for use with material handling of a plurality of articles includes a memory and a processor. The control system is configured to receive a plurality of orders for a plurality of disparate articles, batch the plurality of orders over a period of time, interact with an identifier affixed to an article or packaging associated with the article in order to determine a characteristics of the article, determine one destination container of a plurality of destination containers to deposit, with a transport vehicle, a selected article, wherein the destination container is determined based on at least one order and the determined characteristic of the selected article, direct a first transport vehicle to transport a selected article to the destination container and deposit the selected article by manipulation of the first transport vehicle from a first position to a second position for deposit of the selected article in the destination container, direct a second transport vehicle to transport a disparate article to the destination container and deposit the disparate article by manipulation of the second transport vehicle from the first position to the second position for deposit of the disparate article in the destination container, wherein the destination container is determined based on at least one order that is associated with the selected article, and determine when the order has been completed.

According to one or more embodiments, a system includes an article supply location. The article supply location includes a plurality of articles. The system includes a platform assembly that includes a platform elevated from a proximal surface. The platform defines an opening and a container that is positioned proximal the opening in the platform. The system includes first and second transport vehicles, each having a first position in which an article is stowed about the transport vehicle and a second position in which the article is deposited into a proximal container. The first transport vehicle traverses the platform and positions proximal the opening to deposit the article in the destination container by manipulation from the first position to the second position. A control system is configured to receive an order for a plurality of disparate articles, determine one destination container of a plurality of receiving destination containers to direct the first transport vehicle to deposit a selected article, direct the first transport vehicle to transport a selected article to the destination container and deposit the article by manipulation of the first transport vehicle from the first position to the second position for deposit of the selected article in the destination container, direct the second transport vehicle to transport a disparate article to the destination container and deposit the disparate article by manipulation of the second transport vehicle from the first position to the second position for deposit of the disparate article in the destination container, and determine when the order for purchase has been completed.

BRIEF DESCRIPTION OF THE DRAWINGS

In order to describe the technical solutions of the examples of the present invention more clearly, the figures required to be used for the examples will be briefly introduced below. It should be understood that the following figures only show some examples of the present invention, and thus shall not be construed as limiting the scope thereof; and for a person skilled in the art, further relevant figures could also be obtained according to the figures without using inventive efforts.

DETAILED DESCRIPTION OF THE EMBODIMENTS

Below, the technical solutions in the examples of the present invention are depicted clearly and comprehensively with reference to the figures according to the examples of the present invention. Obviously, the examples depicted here are merely some examples, but not all examples of the present invention. In general, the components in the examples of the present invention depicted and shown in the figures herein can be arranged and designed according to different configurations. Thus, detailed description of the examples of the present invention provided in the figures below are not intended to limit the scope of the present invention as claimed, but merely represent selected examples of the present invention. On the basis of the examples of the present invention, all of other examples that could be obtained by a person skilled in the art without using inventive efforts will fall within the scope of protection of the present invention.

Example 1

Figure 1:
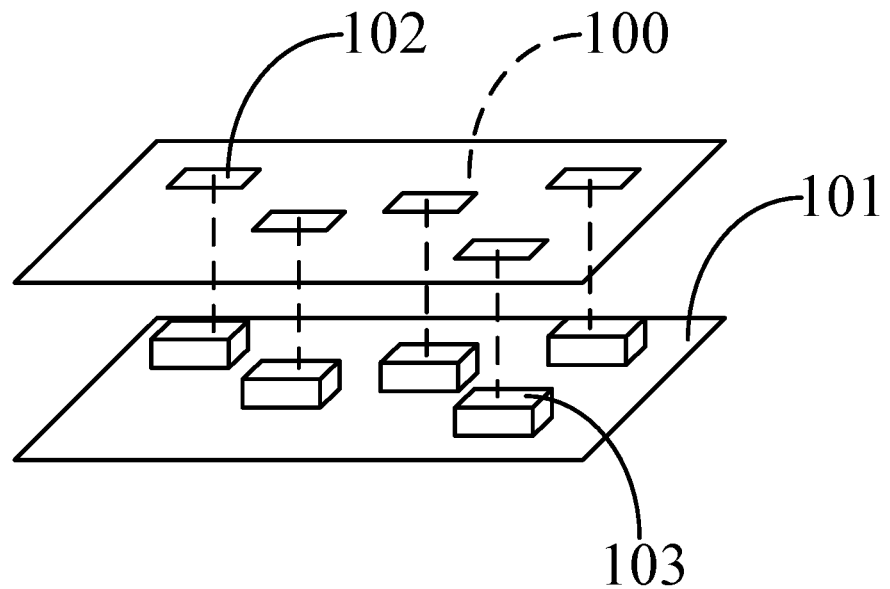
FIG. 1 shows a structural schematic diagram of a sorting system provided in Example 1 of the present invention.

In order to solve the problem existing in the prior art that the parcel sorting efficiency needs to be increased, as shown in FIG. 1, an example of the present invention provides a parcel sorting system. The parcel sorting system includes a parcel sorting device 100 and a parcel collecting device 101; the parcel sorting device 100 is provided thereon with a plurality of parcel checking inlets 104 and a plurality of parcel outlets 102, and the parcel collecting device 101 is located just below the parcel sorting device 100; the plurality of parcel outlets 102 on the parcel sorting device 100 are respectively in communication or connected with the parcel collecting device 101, the plurality of parcel outlets 102 are respectively located at the middle or/and edges of the or throughout the parcel sorting device 100, and the parcel collecting device 101 is provided thereon with storage devices 103, with one storage device located at each of positions of the parcel outlets, and an opening diameter of the storage device 103 is greater than a diameter of the parcel outlet 102.

The parcel sorting device 100 and the parcel collecting device 101 are embodied in many structures, e.g. quadrangle, circle, polygon and so on, and the parcel collecting device 101 and the parcel sorting device 100 preferably have substantially the same area.

In order to improve the parcel sorting efficiency, preferably, each of the parcel checking inlets 104 is provided with one parcel information acquisition device 200. The parcel checking inlets 104 are in one-to-one correspondence with the parcel information acquisition devices 200, the parcel information acquisition devices 200 are configured to acquire parcel information of the parcels to be sorted that enter the parcel checking inlets 104 corresponding to the parcel information acquisition devices 200, and the parcel information contains destinations of the parcels to be sorted.

A plurality of parcel checking inlets 104 are provided, with each parcel checking inlet 104 being provided with a parcel information acquisition device 200, such that the information acquisition and sorting of the plurality of parcels to be sorted may be performed simultaneously at the plurality of parcel checking inlets 104, so as to significantly increase the parcel information acquisition efficiency, thereby improving the parcel sorting efficiency.

In the above, there are many manners for the parcel information acquisition devices 200 to acquire the parcel information of the parcels to be sorted. Preferably, the destination information is carried in a destination address information code, the destination address information code is provided on the parcel to be sorted, each of the parcel information acquisition devices 200 includes a scanner, and the scanner is configured to scan the information code for obtaining the destination of the parcel to be sorted. For example, the parcels to be sorted are provided thereon with information codes containing destination information of the parcels to be sorted, and the parcel information acquisition devices 200 obtain the destinations of the parcels to be sorted by scanning the information codes on the parcels to be sorted, wherein the information code may be a bar code, a two-dimensional code, a radio frequency tag etc., and correspondingly, the parcel information acquisition device 200 may be a bar code scanner, a two-dimensional code scanner, a radio frequency identifier, etc., and the mobile transport device 202 may be an auto-navigating small vehicle.

According to actual demands, in addition to the destination, the parcel information may further contain information about the parcel volume, weight etc., and correspondingly, the parcel information acquisition device 200 may further include a weighing device, a volume scanner, etc.

While the parcel information is highly-efficiently obtained, in order to improve the efficiency of subsequent sorting, preferably, after the plurality of parcel information acquisition devices 200 simultaneously acquire the parcel information of the respective parcels to be sorted, the control device 201 is used to complete the analytical processing of the obtained parcel information of all the parcels to be sorted, thereby obtaining the destination information of the respective parcels to be sorted. For example, the system further includes a control device 201, the control device 201 is in connection with all the parcel information acquisition devices 200 so as to obtain the parcel information acquired by all the parcel information acquisition devices 200, to obtain the destinations of the respective parcels to be sorted.

Figure 2:
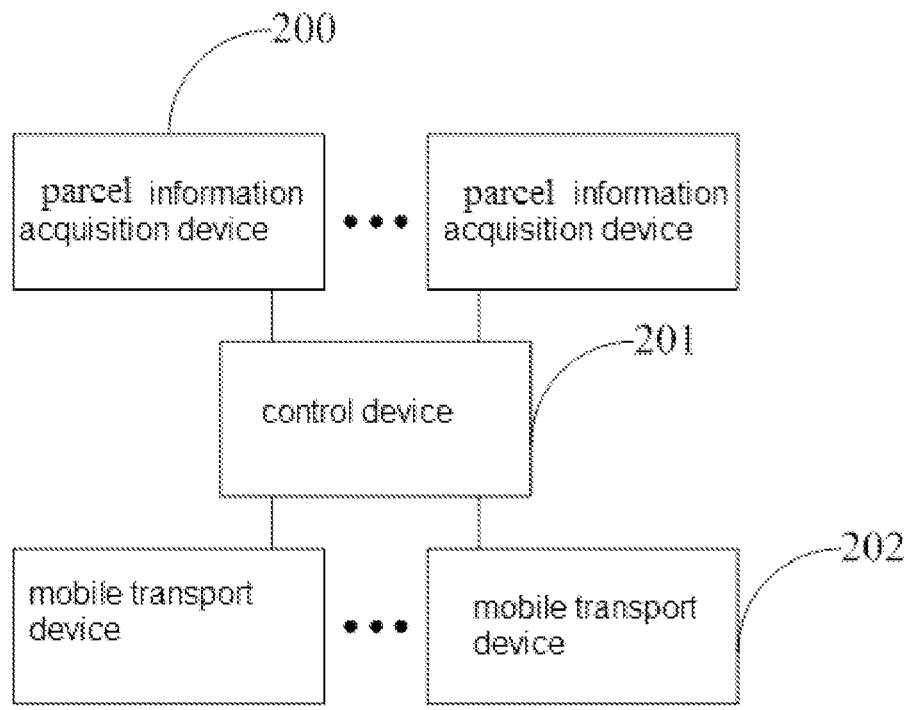
FIG. 2 shows a system chart of the sorting system provided in Example 1 of the present invention.

After obtaining the parcel information, in order to improve the efficiency of the subsequent sorting processes, the system preferably further includes a plurality of mobile transport devices 202, wherein the plurality of mobile transport devices 202 are in connection with the control device 201, the control device 201 is pre-provided with parcel outlets 102 respectively corresponding to different destinations, the control device 201 is further configured to control, according to the obtained destinations of the parcels to be sorted, at least one of the mobile transport devices 202 to transport the parcels to be sorted to the parcel outlets 102 corresponding to the destinations of the parcels to be sorted, as shown in FIG. 2.

In the above, the control device 201 has already obtained the destinations of the respective parcels to be sorted at the respective parcel checking inlets 104, and the parcel sorting can be completed just by obtaining the transport paths of the respective parcels to be sorted through analysis according to the positions of the parcel outlets 102 corresponding to the destinations of the respective parcels to be sorted, and then controlling at least one of the mobile transport devices 202 to transport, according to the transport paths, each of the parcels to be sorted to the parcel outlets 102 corresponding to the destinations of the parcels to be sorted.

The analysis by the control device 201 on the transport paths of the respective parcels to be sorted is performed simultaneously. After the path analysis is completed, the plurality of mobile transport devices 202 may be simultaneously controlled, to simultaneously complete transporting of the individual parcels to be sorted, thereby significantly improving the parcel sorting efficiency.

Each of the mobile transport devices 202 is configured to load one parcel to be sorted or a plurality of parcels to be sorted that go to the same destination. Preferably, the mobile transport device 202 is configured to transport one parcel to be sorted one time, and the control device 201 sends a control instruction to the mobile transport device 202 after obtaining the destination of the parcel to be sorted that is going to be transported by the mobile transport device 202, such that the mobile transport device 202 travels to the position of the parcel outlet 102 corresponding to the destination of the parcel to be sorted.

In the above, the parcels to be sorted may be manually loaded onto the mobile transport devices 202, and the parcels to be sorted may also be automatically loaded onto the mobile transport devices 202 by intelligently controlling parcel gripping devices or the like through the control device 201. Similarly, the transport of the parcels to be sorted from the parcel outlets 102 to the parcel collecting device 101 can be performed manually, and may also be completed by intelligently controlling parcel gripping devices or the like through the control device 201.

Figure 3:
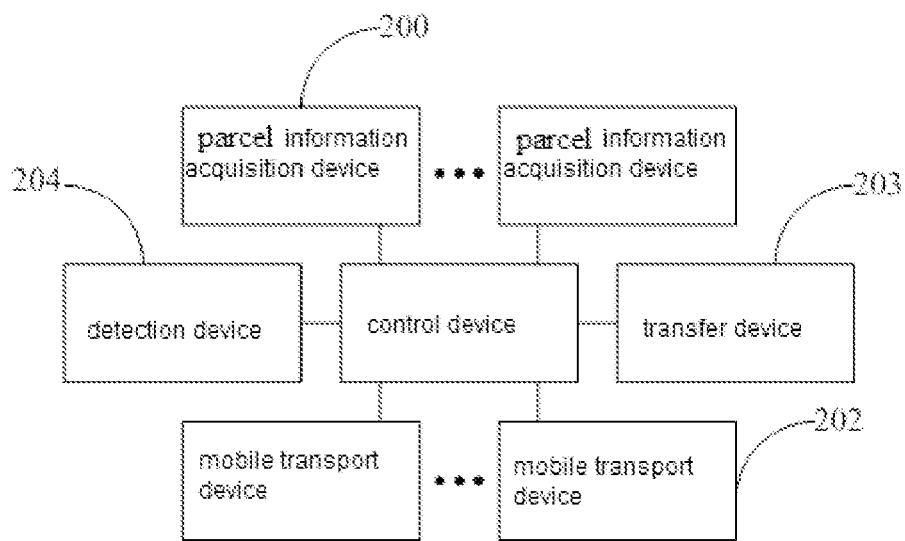
FIG. 3 shows a system chart of another sorting system provided in Example 1 of the present invention.
Figure 4:
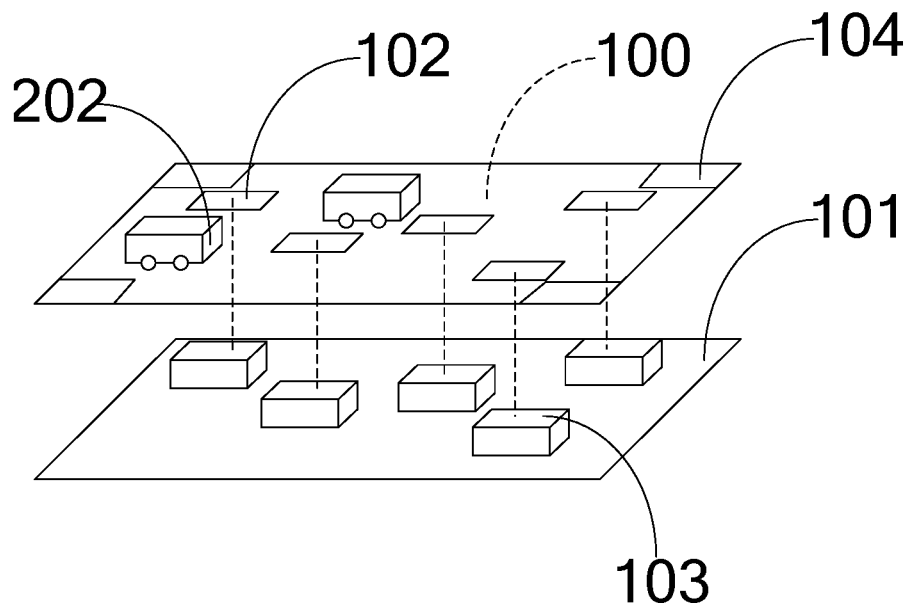
FIG. 4 shows a structural schematic diagram of another sorting system provided in Example 1 of the present invention.

In order to assure that the respective parcels to be sorted that are transported into the parcel collecting device 101 can be delivered in time, the system preferably further includes a detection device 204 and a transfer device 203, wherein the detection device 204 is configured to detect whether a storage device 103 is full or not and to transmit to the control device 201 the obtained information regarding whether the storage device 103 is full or not, and the transfer device 203 is configured to transfer the storage device 103 which is full according to an instruction from the control device 201. There are many options for the transfer device 203, e.g. an intelligent robot; and for another example, the storage device 103 is mounted on the transfer device 203, and the transfer device 203 is a large-scale auto-navigating vehicle and may move to a position and load and unload the parcels according to the control instruction of the control device 201, as shown in FIGS. 3 and 4.

Based on the above-mentioned system architecture, the examples of the present invention are implemented as follows:

the respective mobile transport devices, such as a forklift, transport the parcels to be sorted to the respective parcel checking inlets 104, and the parcel information acquisition devices 200 at the respective parcel checking inlets 104 acquire the parcel information of the respective parcels and transmit the acquired parcel information to the control device 201. The control device 201 performs simultaneous analysis on the parcel information of the plurality of parcels to be sorted to obtain the destinations of the respective parcels to be sorted and the parcel outlets 102 corresponding to the respective destinations, and controls the plurality of mobile transport devices 202 to simultaneously transport the respective parcels to be sorted to the corresponding parcel outlets 102. The parcels to be sorted are delivered from the parcel outlets 102 into the storage devices 103 on the parcel collecting device 101 located below, and then they are moved away from the parcel outlets 102 according to a control instruction of the control device 201 and wait for further instructions. The processes above are repeated till all the parcels to be sorted are delivered into the storage devices 103. In the meantime, the detection device 204 constantly detects whether there is a storage device 203 which is full of parcels, and when there is a storage device 103 full of parcels, the control device 201 controls the transfer device 203 to transfer the storage device 103 and placing an empty storage device 103 at the position where the transferred storage device 103 was, till sorting of all the parcels to be sorted is completed. This could also be performed by a person.

The parcel sorting system provided in an example of the present invention can make full use of the area of the parcel sorting device 100, increasing a plurality of effective parcel outlets 102 and solving the traditional problem of goods accumulation and thereby greatly increasing checking efficiency, so as to make the whole operation flow of the parcel sorting more systematized and intelligentized. And a "double" structure is creatively adopted, with the parcel sorting device 100 and the parcel collecting device 101 being arranged one above the other for sorting parcels, wherein the parcel outlets 102 on the parcel sorting device 100 are in communication or positioning with the parcel collecting device 101, and during parcel sorting, the parcels to be sorted can enter the parcel collecting device 101 arranged below just by passing through the parcel outlets 102, thereby completing the sorting. Such a structural design enables that the parcel outlets 102 can be flexibly arranged on the edges of the parcel sorting device 100 or at middle positions of the edges, rather than only being provided at the edges of the parcel sorting device 100 as those in the prior art, where the middle position in the examples of the present invention refers to positions on the parcel sorting device 100 other than the edges. The utilization ratio of the parcel sorting device 100 is efficiently improved, the transport path for parcel sorting is shortened, the parcel sorting efficiency is increased, and the design is very ingenious.

Example 2

Figure 5:
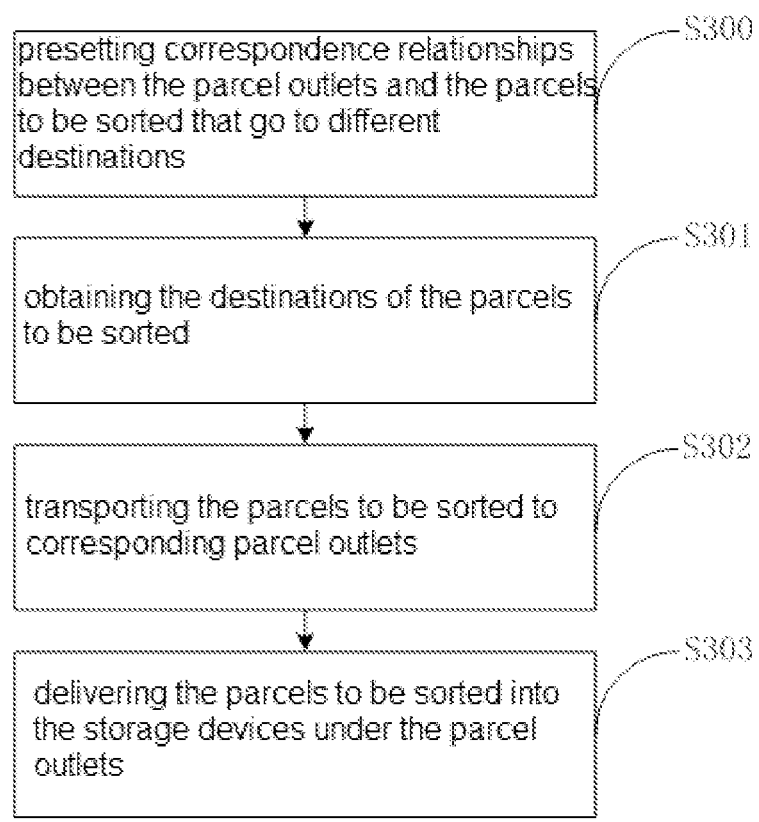
FIG. 5 shows a schematic flow diagram for sorting provided in Example 2 of the present invention.

As shown in FIG. 5, an example of the present invention provides a parcel sorting method, which is applied to a parcel sorting system, wherein the parcel sorting system comprises a parcel sorting device and a parcel collecting device; the parcel sorting device is provided with a plurality of parcel checking inlets and a plurality of parcel outlets, and the parcel collecting device is located just below the parcel sorting device; the plurality of parcel outlets on the parcel sorting device are respectively in communication with the parcel collecting device, the plurality of parcel outlets are respectively located at the middle or/and edges of the parcel sorting device, and the parcel collecting device is respectively provided thereon with storage devices, with one storage device located at each of positions the parcel outlets, and an opening diameter of the storage device is greater than a diameter of the parcel outlet; and the method includes:
  step S300: presetting correspondence relationships between the parcel outlets and the parcels to be sorted that go to different destinations; step S301: obtaining the destinations of the parcels to be sorted; step S302: transporting the parcels to be sorted to the parcel outlets corresponding to the destinations of the parcels to be sorted; and step S303: delivering, through the parcel outlets, the parcels to be sorted into the storage devices under the parcel outlets.

In order to improve the parcel sorting efficiency, preferably, each of the parcel checking inlets is provided with one parcel information acquisition device, the parcel checking inlets are in one-to-one correspondence with the parcel information acquisition devices, and obtaining the destinations of the parcels to be sorted includes: acquiring, by the respective parcel information acquisition devices, the parcel information of the parcels to be sorted that enter the parcel checking inlets corresponding to the parcel information acquisition devices, with the parcel information containing the destinations of the parcels to be sorted.

There are many manners for the parcel information acquisition devices to acquire the parcel information on the parcels to be sorted. Preferably, the destination information is carried in a destination address information code, the destination address information code is provided on the parcel to be sorted, each of the parcel information acquisition devices includes a scanner, and the scanner is configured to scan the information code for obtaining the destination of the parcel to be sorted. For example, the parcels to be sorted are provided thereon with information codes containing destination information of the parcels to be sorted, and the parcel information acquisition devices obtain the destinations of the parcels to be sorted by scanning the information codes on the parcels to be sorted, wherein the information code may be a bar code, a QR code, an RF Tag etc., and correspondingly, the parcel information acquisition device may be a bar code scanner, a two-dimensional code scanner, a radio frequency identifier, etc., and the mobile transport device may be an auto-navigating small vehicle.

According to actual demands, in addition to the destination, the parcel information may further contain information about the parcel volume, weight etc., and correspondingly, the parcel information acquisition device may further include a weighing device, a volume scanner, etc.

While the parcel information is highly-efficiently obtained, in order to improve the efficiency of subsequent sorting, preferably, after the plurality of parcel information acquisition devices simultaneously acquire the parcel information of the respective parcels to be sorted, the control device is used to complete the analytical processing of the obtained parcel information of all the parcels to be sorted, thereby obtaining the destination information of the respective parcels to be sorted. For example, the system further includes a control device and a plurality of mobile transport devices, wherein the correspondence relationships between the parcel outlets and the parcels to be sorted that go to different destinations are preset in the control device, and transporting the parcels to be sorted to the parcel outlets corresponding to the destinations of the parcels to be sorted includes: obtaining, by the control device, the parcel information acquired by all the parcel information acquisition devices to obtain the destinations of the respective parcels to be sorted; and controlling at least one of the mobile transport devices, according to the obtained destinations of the parcels to be sorted, to transport the parcels to be sorted to the parcel outlets corresponding to the destinations of the parcels to be sorted.

After obtaining the parcel information, in order to improve the efficiency of the subsequent sorting processes, the system preferably further includes a detection device and a transfer device, and the method further includes: obtaining, by the control device, the information detected by the detection device about whether the storage device is full or not, and when obtaining information indicating that the storage device is full, transmitting to the transfer device an instruction for transferring the storage device which is full.

In the above, the control device has already obtained the destinations of the respective parcels to be sorted at the respective parcel checking inlets, and the parcel sorting can be completed just by obtaining the transport paths of the respective parcels to be sorted through analysis according to the positions of the parcel outlets corresponding to the destinations of the respective parcels to be sorted, and then controlling at least one of the mobile transport devices to transport, according to the transport paths, each of the parcels to be sorted to the parcel outlets corresponding to the destinations of the parcels to be sorted.

The analysis by the control device on the transport paths of the respective parcels to be sorted is performed simultaneously. After completing the path analysis, the plurality of mobile transport devices may be simultaneously controlled to simultaneously complete transporting of the respective parcels to be sorted, thereby significantly improving the parcel sorting efficiency.

Each of the mobile transport devices is configured to load one parcel to be sorted or a plurality of parcels to be sorted that go to the same destination. Preferably, the mobile transport device is configured to transport one parcel to be sorted one time, and the control device sends a control instruction to the mobile transport device after obtaining the destination of the parcel to be sorted that is going to be transported by the mobile transport device, such that the mobile transport device travels to the position of the parcel outlet corresponding to the destination of the parcel to be sorted.

In the above, the parcels to be sorted may be manually loaded onto the mobile transport device, and the parcels to be sorted may also be automatically loaded onto the mobile transport devices by intelligently controlling parcel gripping devices or the like through the control device. Similarly, the transport of the parcels to be sorted from the parcel outlets to the parcel collecting device can be performed manually, and may also be completed by intelligently controlling parcel gripping devices or the like through the control device.

As to the methods provided in the examples of the present invention, the implementation principles and the technical effects produced thereof are the same as those in the preceding examples regarding the systems, and for brief description, as for contents not mentioned in the examples regarding the methods, reference can be made to the corresponding contents in the preceding examples regarding the systems.

Example 3

Figure 6:
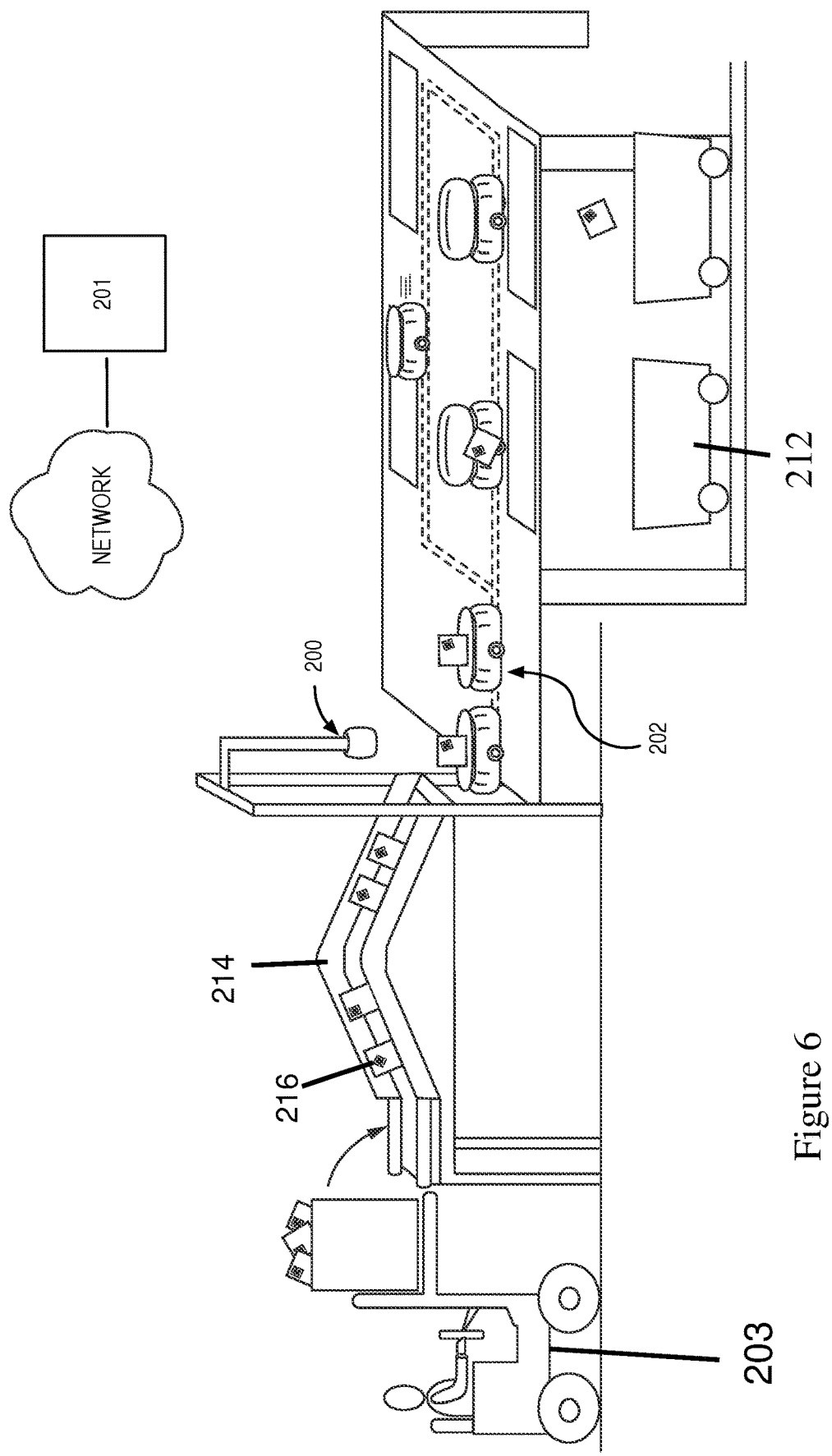
FIG. 6 shows an illustration of an embodiment of the system disclosed herein.

As illustrated in FIG. 6, a system for use in an order fulfillment center or any other facility that receives orders or listings of articles for an order. The system provides an improvement for sorting orders and packaging the same for fulfillment. The system includes a platform that is elevated proximal to a lower level, which in some embodiments may be a second platform. The platform provides a surface for transport vehicles 202 to traverse to deposit an article to a destination container 208. In operation, a device or conveyor delivers a container of articles proximal a chute 214 or other material handling system. The material handling system delivers the container of articles to an article supply location. The container may contain product that is identical or may be disparate product.

An operator may select an article from the container and image an identifier 216 positioned on the article via the acquisition device 200. Optionally, the acquisition device 200 may automatically interact with identifier 216 for article recognition. The operator may place the article on the vehicle 202, or the system and process may be set up so that such deposition of article onto vehicle 202 is automated. The acquisition device 200 may then communicate the article identifier information to the control device 201.

The article supply, namely the articles shown in the containers, may be a supply of articles that has identifier 216 on each article. The information acquisition devices 200 obtain the information contained in the identifier 216 of the articles to be sorted by identifying the information codes on the articles to be sorted, wherein the information code may be a bar code, a two-dimensional code, a radio frequency tag etc., and correspondingly, the parcel information acquisition device 200 may be a bar code scanner, a two-dimensional code scanner, a radio frequency identifier, etc.

The transport vehicle 202 may have a first position in which an article is stowed about the vehicle and a second position in which the article is deposited into a proximal destination container.

Additionally, the information acquisition device may be configured to image the article and compare against a database of known articles to determine a characteristic, SKU or identity of the article.

In one or more embodiments, the mobile transport device 202 may be an auto-navigating small vehicle.

The control system 201 is configured to determine one destination container 208 of a plurality of destination containers to deposit, with the transport vehicle 202, a selected article based on the interaction with the identifier 216. The control system 201 is further configured to direct the transport vehicle to transport the selected article to the destination container and deposit the article by manipulation of the transport car from the first position to the second position for deposit of the selected article in the destination container.

The system may be embodied in a multiple level arrangement. The multiple level arrangement may include an elevated platform above a lower level, which may be the floor or a second platform. In operation, the control system determines that a destination container needs an article deposited therein. In the multiple level arrangement, the destination container is positioned proximal an opening in the elevated platform. The transport vehicle traverses the elevated platform to the destination container and deposits the article by manipulation of the transport vehicle from the first position to the second position for deposit of the selected article in the destination container.

As an example, consider a situation at an order fulfillment facility where an order calls for 3 red shirts, 2 blue shirts, and 2 pair of blue jeans to be transported to an end destination retailer. The control system 201 may know that at article supply #1 are the red shirts, article supply #5 has blue shirts, and article supply #13 has blue jeans. The control system 201 directs a respective transport vehicle 202 to each of article supply #1, article supply #5, and article supply #13. The control system 201 also determines or otherwise knows that the destination container for delivery of the order is located at a certain location on the platform. The control system 201 then directs each respective transport vehicle 202 to deposit articles into the destination container until the entire order is filled. At that time, the control system 201 knows that the order is filled and can direct or otherwise instruct removal of the destination container.

The control system may be further configured to direct the transport vehicle to return to be proximally located at any article supply. The transport vehicle is in the first position upon being proximal at an article supply. The control system may be further configured to direct a plurality of transport vehicles such that the transport vehicles do not collide with one another.

Disclosed herein is thus a system. The system includes an article supply. The article supply includes a plurality of articles at an order fulfillment center. In operation, the system has a method or material handling system to move and transport containers of articles. The method or material handling system delivers a container of articles to an article supply location. The container may contain product that is identical or may be disparate product. A control system 201 communicates over a network. The network may be a wired or wireless network. The wireless network may be Bluetooth®, WIFI, a specific Radio Frequency, cellular, and the like. The control system 201 may be embodied as a server with a processor and a memory, where the processor executes many instructions provided herein. The control system 201 may be configured to receive an order for a plurality of disparate articles to fulfill an order. The disparate articles may be a plurality of similar articles having different sizes, colors, and the like, such as apparel, or the disparate articles may be largely unrelated. The control system 201 may be configured to determine one destination container of a plurality of destination containers to deposit, with the transport vehicle, a selected article. The control system 201 may be configured to direct the transport vehicle to transport the selected article which is stowed about the vehicle to the destination container and deposit the article by manipulation of the transport vehicle from the first position to the second position for deposit of the selected article in the destination container. The control system 201 may be configured to direct the transport vehicle to transport a disparate article to the destination container and deposit the disparate article by manipulation of the transport vehicle from the first position to the second position for deposit of the selected disparate article in the destination container. The control system 201 may be configured to determine when the order is complete.

The system may include an information acquisition device 200 that is configured to image the selected article. The control system may then be further configured to determine a characteristic of the selected article by interacting with the selected article with the information acquisition device. This interaction may include optical recognition to determine one or more characteristic of an article, including size, color, deformation or other defect, UPC or other identifying code, and the like.

The control system may be further configured to determine a characteristic of the selected article by interacting with an identifier 216 of the selected article with the information acquisition device. The identifier may be a UPC or other product code associated with the article.

The system may further include an elevated platform above a lower level. The transport vehicle traverses the platform. The destination container is positioned proximal a recess in the platform. The transport vehicle traverses the platform, positions the vehicle proximal the recess and then manipulates from the first position to the second position to deposit the article. Each transport vehicle may carry a respective single selected article, and multiple transport vehicles may be traversing the platform at any given time. The control system may be configured to direct the transport vehicle to return to a position proximal an article supply. The transport vehicle is in the first position upon being proximal an article supply. The control system may be configured to direct a plurality of transport vehicles. The control system is further configured to direct the plurality of transport vehicles such that the transport vehicles do not collide with one another.

A method may also be provided. The method may include receiving an order for a plurality of disparate articles, determining one destination container of a plurality of destination containers to direct the transport vehicle to deposit a selected article, directing the first transport vehicle to transport the selected article to the destination container and deposit the article by manipulation of the first transport vehicle from the first position to the second position for deposit of the selected article in the destination container, directing the second transport vehicle to transport a disparate article to the destination container and deposit the disparate article by manipulation of the second transport vehicle from the first position to the second position for deposit of the selected disparate article in the destination container, and determining when the order has been completed.

Example 4

In another example utilizing the same or many of the components discussed in regard to Example 3, a control system receives an order for fulfillment. The order, in this example, may include articles from various portions of a warehouse or fulfillment center. The control system batches orders, thus allowing for multiple orders to be fulfilled at once in a time efficient manner.

The control system may then determine that a plurality of articles to be sorted are located within a first portion of the fulfillment center, and a second plurality of articles to be sorted are located within a second portion of the fulfillment center, and the like. The plurality of articles span the batched orders.

The control system may then direct a person or an automated machine to pull the plurality of articles associated with the batched orders where the articles are in the first portion of the fulfillment center. Those pulled articles in the first location may then be positioned in a case, bin or other container. Similarly, the pulled articles in the second location may then be positioned into a separate case, bin or other container. The bin or other container is then taken to a conveyor, chute, or the like to transport the pulled articles to a location of article supply. A person may then position an article onto a transport vehicle, or an automated machine may then position the article onto the transport vehicle.

The information acquisition device may then image the UPC or other identifying code on the article to determine the article identity. The information acquisition device then communicates the article identity to the control system, which is then able to compare the article identity to the database of orders that have been batched, and assign a destination container for depositing the article based on the orders. The control system then does this for each item until the orders are filled.

The destination container may be positioned below the platform, where a chute may extend from the elevated platform to the destination container in order to guide the article into the destination container.

Example 5

In another example utilizing the same or many of the components discussed in regard to Example 3, a control system receives an order for store fulfillment. The order, in this example, may include articles from various portions of a warehouse or fulfillment center. The control system batches orders for stores, thus allowing for multiple store orders to be fulfilled at once in a time efficient manner.

The control system may then determine that a plurality of articles to be sorted are located within a first portion of the fulfillment center, and a second plurality of articles to be sorted are located within a second portion of the fulfillment center, and the like. The plurality of articles span the store orders.

The control system may then direct a person or an automated machine to pull the plurality of articles associated with the stores orders where the articles are in the first portion of the fulfillment center. Those pulled articles in the first location may then be positioned in a case, bin or other container. Similarly, the pulled articles in the second location may then be positioned into a separate case, bin or other container. The bin or other container is then taken to a conveyor, chute, small vehicle, or the like to transport the pulled articles to a location of article supply. A person may then place an article onto a transport vehicle, or an automated machine may then place the article onto the transport vehicle.

The information acquisition device may then image the UPC or other identifying code on the article to determine the article identity. The information acquisition device then communicates the article identity to the control system which is then able to compare the article identity to the database of store orders that have been batched, and assign a destination container for depositing the article based on the individual store. The control system then does this for each article until a store order is filled.

The control system may be further configured to segregate a store order into departments such that all articles for a given store department are assigned to a single destination container. Store departments may include or be defined as women's, men's, shoes, etc.

The destination container may be positioned below the platform, where a chute may extend from the elevated platform to the destination container in order to guide the article into the destination container.

Example 6

In another example utilizing the same or many of the components discussed in regard to Example 3, an operation receives returns of articles from a customer. The returns arrive at a returns processing area and are received into the facility. In operation, a method, device or conveyor delivers a container of returned articles proximal a chute or other material handling system or method. The material handling system or method delivers the container of returned articles to an article supply location.

An operator may then place a single returned article onto a transport vehicle, or an automated machine may then place the article onto the transport vehicle.

The information acquisition device may then image the UPC or other identifying code on the article to determine the article identity. The information acquisition device then communicates the article identity to the control system is then able to compare the article identity to the database of the articles in the article master database, and assign a destination container for depositing the article based on the article identity or SKU. The control system then does this for each article until all returned articles have been transported and deposited into destination containers. The control system can be configured to transport and deposit identical or similar articles into a single destination container.

The destination container may be positioned below the platform, where a chute may extend from the the elevated platform to the destination container in order to guide the article into the destination container.

Example 7

In another example utilizing the same or many of the components discussed in regard to Example 3, a control system receives an order for fulfillment. The order, in this example, may include articles from various portions of a warehouse or fulfillment center. The control system batches orders, thus allowing for multiple orders to be fulfilled at once in a time efficient manner.

The control system may then determine that a plurality of articles to be sorted are located within a first portion of the fulfillment center, and a second plurality of articles to be sorted are located within a second portion of the fulfillment center, and the like. The plurality of articles span the batched orders.

The control system may then direct a person or an automated machine to pull the plurality of articles associated with the batched orders where the articles are in the first portion of the fulfillment center. Those pulled articles in the first location may then be positioned in a case, bin or other container. Similarly, the pulled articles in the second location may then be positioned into a separate case, bin or other container. The bin or other container is then taken to a conveyor, chute, or the like to transport the pulled articles to a location of article supply. A person may then position an article onto a transport vehicle, or an automated machine may then position the article onto the transport vehicle.

The information acquisition device may then image the UPC or other identifying code on the article to determine the article identity. The information acquisition device then communicates the article identity to the control system, which is then able to compare the article identity to the database of orders that have been batched, and assign a destination container for depositing the article based on the orders. The control system then does this for each item until the orders are filled.

The destination container may be positioned on the same platform or surface as the transport vehicle and the transport vehicle may deposit directly into the destination container.

As to the above, they are merely specific embodiments of the present invention; however, the scope of protection of the present invention is not limited thereto, and within the disclosed technical scope of the present invention, any modifications or substitutions that a person skilled in the art could readily conceive of should fall within the scope of protection of the present invention. Thus, the scope of protection of the present invention shall be determined by the scope of protection of the appended claims.

The invention claimed is:

1. A system comprising:
a destination container;
an article delivery device;
a transfer device configured for transferring the destination container to a transfer location;
a control system configured to:
determine the destination container is ready for transfer after the article delivery device has delivered an article to the destination container;
direct the transfer device to transfer the destination container to the transfer location.

2. The system of claim 1, wherein the control system is further configured to direct the transfer device to place an empty destination container at a position of the transferred destination container.

3. The system of claim 1, wherein the control system is further configured to determine when the destination container is full.

4. The system of claim 1, wherein the article delivery device delivers a plurality of articles to the destination container, wherein the plurality of articles is identical to each other.

5. The system of claim 1, further comprising an article deposition mechanism configured for loading an article about the article delivery device, wherein the article deposition mechanism is configured for manual loading of the article about the article delivery device by an operator.

6. The system of claim 1, wherein the transfer device comprises one of: an intelligent robot, and an auto-navigating vehicle.

7. The system of claim 1, wherein the destination container is mounted on the transfer device.

8. The system of claim 1, wherein the article delivery device is a computer-controlled transport vehicle, and wherein the destination container is positioned on a same surface as the computer-controlled transport vehicle.

9. The system of claim 1, wherein the article delivery device is a computer-controlled transport vehicle, and wherein an automated machine positions the article onto the computer-controlled transport vehicle.

10. The system of claim 1, wherein the control system is configured to direct the transfer device to replace the destination container that is full or that contains a complete order with an empty destination container.

11. The system of claim 10, wherein the control system is further configured to direct the article delivery device to resume delivery of articles to the empty destination container.

12. The system of claim 1, wherein the article delivery device delivers a plurality of disparate articles to the destination container.

13. The system of claim 12, wherein the control system is further configured to batch a plurality of orders.

14. A system comprising:
a destination container;
an article delivery device;
a transfer device configured for transferring the destination container to a delivery location;
a control system configured to:
determine the destination container is ready for transfer after the article delivery device has delivered all articles associated with an order to the destination container;
direct the transfer device to transfer the destination container to the delivery location.

15. The system of claim 14, wherein the transfer device comprises one of: an intelligent robot, and an auto-navigating vehicle.

16. The system of claim 14, wherein the destination container is mounted on the transfer device, wherein an article is unloaded from the destination container at the delivery location.

17. The system of claim 14, wherein the article delivery device is a computer-controlled transport vehicle, and wherein the destination container is positioned on a same surface as the computer-controlled transport vehicle.

18. A system comprising:
an article location;
an article delivery device;
an article deposition mechanism configured for loading an article about the article delivery device;
a destination container; and
a transfer device configured for transferring the destination container to a delivery location;
a control system configured to:
determine the destination container to deposit an article thereinto;
direct the article delivery device to deposit the article into the destination container;
direct the transfer device to transfer the destination container to the delivery location.

19. The system of claim 18, wherein the article deposition mechanism is configured for one of: automated loading of the article about the article delivery device; and, manual loading of the article about the article delivery device by an operator.

20. The system of claim 18, further comprising a platform elevated from a surface, wherein the destination container is positioned about the surface, wherein the article delivery device comprises a transport vehicle configured for traversing the platform.

* * * * *